United States Patent [19]

Bode et al.

[11] Patent Number: 4,838,102

[45] Date of Patent: Jun. 13, 1989

[54] ROTATING DRIVE MECHANISM FOR SWINGING DOORS ESPECIALLY ON VEHICLES

[75] Inventors: Jurgen Bode, Kassel; Manfred Horn, Kaufungen, both of Fed. Rep. of Germany

[73] Assignee: Gebr. Bode & Co, GmbH, Kassel, Fed. Rep. of Germany

[21] Appl. No.: 158,182

[22] Filed: Feb. 19, 1988

[30] Foreign Application Priority Data

Feb. 20, 1987 [DE] Fed. Rep. of Germany ....... 3705370

[51] Int. Cl.[4] .......................... E05F 15/04; F01B 3/04; F16H 21/44

[52] U.S. Cl. ..................................... 74/89.15; 49/334; 49/335; 74/99 R; 74/424.8 R; 92/31; 92/33; 92/136

[58] Field of Search ....................... 74/89, 89.15, 99 R, 74/424.8 R; 49/334, 335; 92/31, 32, 33, 136

[56] References Cited

U.S. PATENT DOCUMENTS

| | | | |
|---|---|---|---|
| 3,438,451 | 4/1969 | Hayes, Jr. | 92/31 X |
| 4,196,654 | 4/1980 | Stearns | 92/31 X |
| 4,731,886 | 3/1988 | Heinrich et al. | 49/335 X |

FOREIGN PATENT DOCUMENTS

| | | | |
|---|---|---|---|
| 1961573 | 7/1971 | Fed. Rep. of Germany | 49/334 |
| 2919435 | 12/1979 | Fed. Rep. of Germany . | |
| 2236103 | 7/1973 | France | 92/33 |
| 322144 | 3/1970 | Sweden | 49/334 |
| 2073815 | 10/1981 | United Kingdom | 49/335 |

*Primary Examiner*—Allan D. Herrmann

*Attorney, Agent, or Firm*—Sprung Horn Kramer & Woods

[57] ABSTRACT

A rotating drive mechanism for swinging doors, especially on vehicles, with a helical transmission consisting of a stator that is rigidly connected to the housing of the rotating drive mechanism, a rotor that can rotate but cannot move axially and that is rigidly connected to the driveshaft, a coupling component that moves axially to rotate the rotor in relation to the stator, and a pneumatic or hydraulic drive cylinder with a piston rod that is connected to the coupling component. The drive cylinder is an annular cylinder that has an outer and an inner jacket as well as an annular piston between the inner and the outer jacket. The coupling component is a nut that extends into the inner cylinder jacket and surrounds a rotor in the form of a threaded spindle. The rotor extends coaxially through the inside of the inner jacket and is, where it emerges from the housing, in one piece with the stub of the takeoff shaft. The coupling component is non-rotationally connected to an axial positioning mechanism that has rollers that travel in a positioning slot in the stator.

8 Claims, 3 Drawing Sheets

ROTATING DRIVE MECHANISM FOR SWINGING DOORS ESPECIALLY ON VEHICLES

BACKGROUND OF THE INVENTION

The invention concerns a rotating drive mechanism for swinging doors, especially on vehicles, with a helical transmission consisting of a stator that is rigidly connected to the housing of the rotating drive mechanism, a rotor that can rotate but cannot move axially and that is rigidly connected to the driveshaft, a coupling component that moves axially to rotate the rotor in relation to the stator, and a pneumatic or hydraulic drive cylinder with a piston rod that is connected to the coupling component.

A rotating drive mechanism of this type is known. It is described for example in German OS No. 2 919 435.

The known drive mechanism is intended to make it possible to considerably reduce overall height. This is attained in accordance with the known mechanism in that the piston rod is hollow, with the helical transmission mounted directly on the inner surface of the wall of the hollow component.

SUMMARY OF THE INVENTION

The object of the instant invention is to improve a rotating drive mechanism with the aforesaid characteristics to the extent that even more overall height will be saved, whereas enough height will be left for the helical transmission, which will also be separate enough from the pneumatic or hydraulic drive mechanism to prevent sealing problems. It should also be possible without modifying the stator, rotor, coupling component, or drive cylinder for one or both ends of the driveshaft to accommodate the total driving torque. Finally, it should be possible to vary the ratio of the helical transmission in a simple way.

This object is attained in accordance with the invention by the improvement wherein the drive cylinder is a double-acting annular cylinder that accommodates certain components of the rotor or of the driveshaft and that has an outer and an inner jacket, a base, and a cap as well as an annular piston that is positioned tightly against the outer and inner jackets with a tubular piston rod extending between the inner jacket and the cap and connected outside of the cylinder to the coupling component.

Practical developments of the rotating drive mechanism in accordance with the invention are further described later herein with reference to preferred embodiments. An "annular cylinder" in the sense of the invention is a drive cylinder with an operational space that has a circular cross-section due to being demarcated on the inside by an inner jacket and by an outer jacket on the outside and due to the piston being annular and extending tightly between the outer and the inner jacket. Inside the inner jacket of the cylinder accordingly parts that either rotate or slide back and forth axially can be accommodated, specifically parts both of the axially moving coupling component and of the rotating rotor or of the driveshaft. Since not only the rotor but also the coupling component can accordingly extend deep into the drive cylinder, the overall height can be considerably reduced. The axial positioning structures, which are preferably rollers, can have a variable pitch, allowing the transmission ratio to vary during the course of the axial motion.

The improved design of the drive cylinder also allows the driveshaft to extend all the way through the cylinder housing and emerge at each end, so that the driving torque can be accommodated at both ends of the driveshaft. It is also possible to connect the piston rod to the coupling component in such a way that they will interlock only axially and their radial motions will be independent. The design also in particular allows tolerances to be compensated in embodiments in which the torque is accommodated at both ends.

BRIEF DESCRIPTION OF THE DRAWINGS

Three embodiments of the rotating drive mechanism in accordance with the invention will now be described with reference to the drawings, wherein.

DETAILED DESCRIPTION OF THE INVENTION

Figure 1:
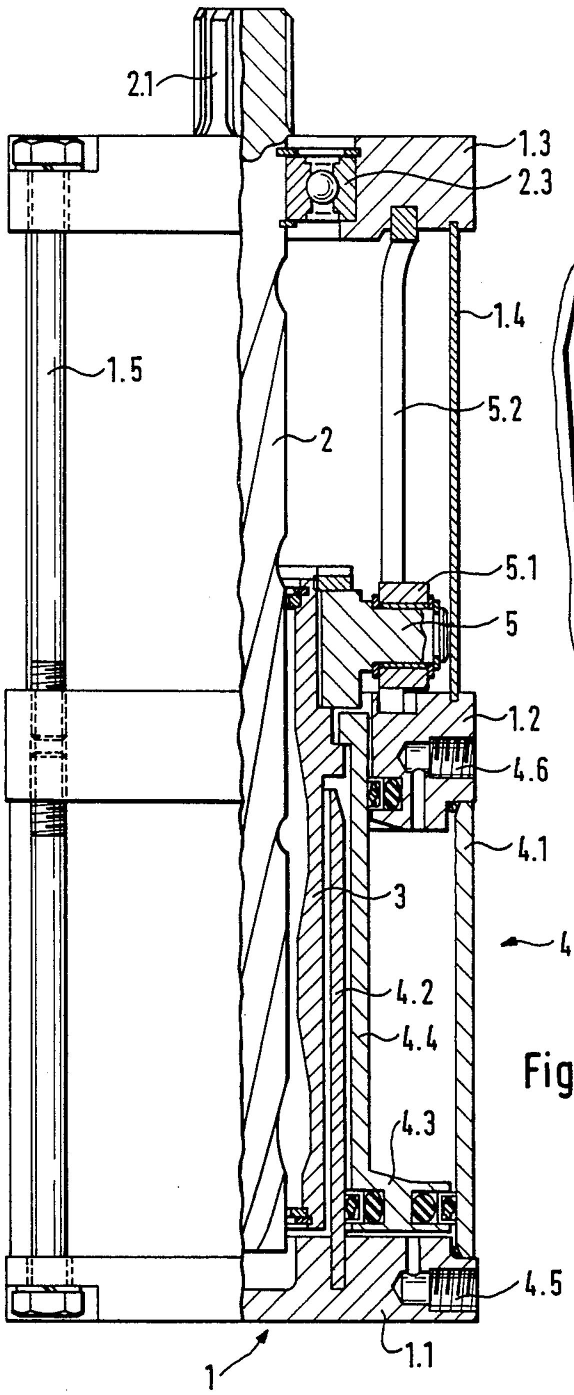
FIG. 1 is a partly axially sectional illustration of one embodiment of a rotating drive mechanism.

With reference now to FIG. 1, a rotating drive mechanism for swinging doors, especially on vehicles, in mass transit for example, has a housing 1 in the form of a cylinder. The housing has two face caps 1.1 and 1.3 and an annular intermediate flange 1.2 as well as a jacket with grooves 5.2 that constitutes a stator and a covering sleeve 1.4. The outer wall 4.1 at the bottom of the housing is simultaneously the outer jacket of a cylindrical drive cylinder 4, which will be described in greater detail later herein. The housing as a whole is secured together by axial screws 1.5.

Drive cylinder 4 consists of the two jackets, one 4.2 positioned coaxial inside the other 4.1, of base 1.1, and of cap 1.2. The associated piston 4.3 is annular and slides back and forth tightly between outer jacket 4.1 and inner jacket 4.2. Piston 4.3 is connected to a tubular piston rod 4.4 that extends axially directly along inner jacket 4.2. Piston rod 4.4 extends tightly out of drive cylinder 4 between cap 1.2 and inner jacket 4.2 and is connected to a coupling component 3 that in this embodiment consists of an elongated nut extending down into inner cylinder jacket 4.2 and accommodating a threaded spindle 2 that constitutes the rotor of a helical transmission. The upper end of spindle 2 is mounted in a ball bearing 2.3 on housing 1 and is in one piece with the stub 2.1 of a takeoff shaft.

Figure 1A:
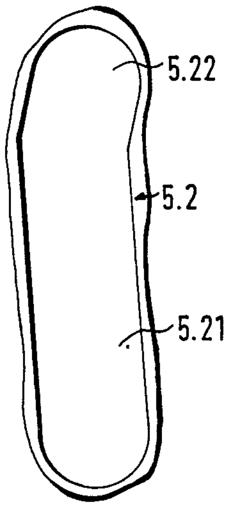
FIG. 1*a* illustrates the shape of the positioning slot in the embodiment, illustrated in FIG. 1, FIG. 2 a view similar to that in FIG. 1 of a variant with two driveshafts.

Coupling component 3 is also non-rotationally connected to a positioning mechanism 5 that dictates its rotation when piston 4.3 travels axially. Positioning mechanism 5 has rotating rollers 5.1 that travel in grooves 5.2 rigidly connected to drive-mechanism housing 1. Positioning mechanism 5 is, in a way that is not illustrated in FIG. 1, mounted on at least two sides of coupling component 3. With reference now to FIG. 1*a*, the positioning can consist of two sections, specifically a lower section 5.21 and a short upper section 5.22, that extend in the form of a helix with different pitches.

The function of the rotating drive mechanism illustrated in FIG. 1 will no be described.

When drive cylinder 4 is supplied with pressure medium through an inlet 4.5, piston 4.3 will travel axially, axially entraining coupling component 3 by way of piston rod 4.4. Since coupling component 3 engages threaded spindle 2 and is positioned by mechanism 5, the spindle and hence takeoff-shaft stub 2.1 will begin to rotate. In the final phase of the motion, as roller 5.1 arrives in section 5.22 of positioning 5.2, the ratio between the pitches will change, varying the ratio of the helical transmission during the last phase of motion.

The opposite motion is initiated by supplying pressure medium to drive cylinder 4 through inlet 4.6.

Figure 2:
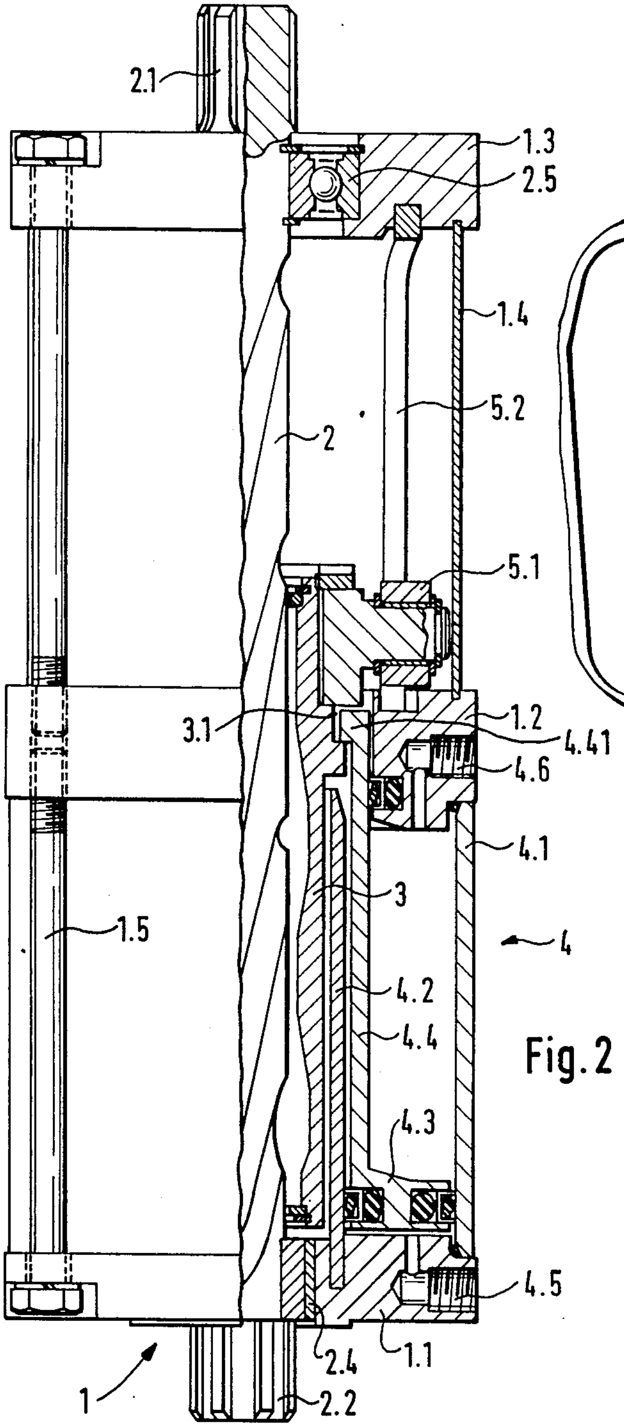
FIG. 2*a* is a view similar to that in FIG. 1*a* illustrating the shape of the positioning slot groove in the embodiment illustrated in FIG. 2.
Figure 2A:
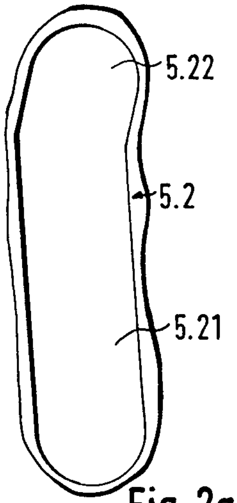

FIGS. 2 and 2*a* illustrate a variant of the embodiment illustrated in FIG. 1, from which it differs essentially only due to the presence of two takeoff-shaft stubs 2.1 and 2.2, whereby lower stub 2.2 is mounted on a bearing 2.4 in mechanism housing 1 and upper stub 2.1 is mounted on a ball bearing 2.5 in cap 1,3. Furthermore piston rod 4.4 interlocks with coupling component 3 only axially, for which purpose the end of the piston rod has an inward-facing collar 4.41 that engages an annular slot 3.1 on the surface of the coupling component. The inside diameter of collar 4.41 is longer than the diameter of annular slot 3.1, allowing mutual radial play. This feature prevents radial tolerances from impeding the motion of piston 4.3.

The design and function of this embodiment are otherwise identical to those of the embodiment illustrated in FIG. 1, and the same reference numbers are employed for the identical parts.

Figure 3:
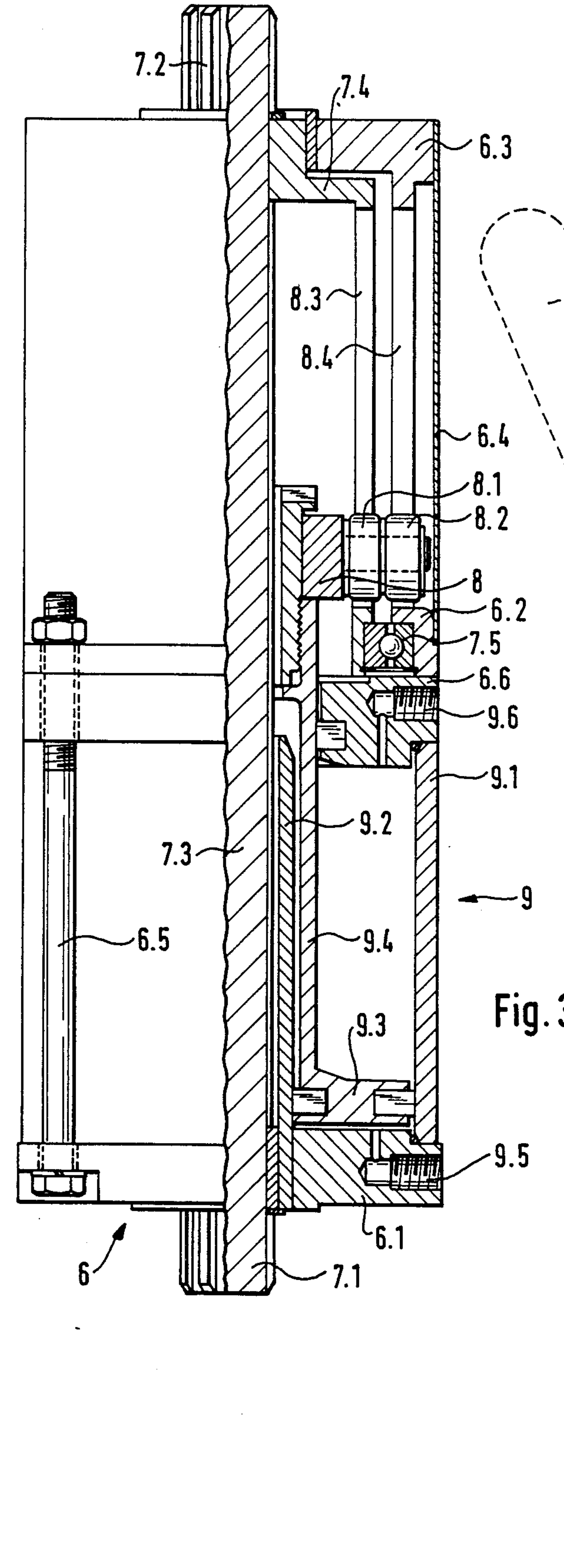
FIG. 3 is a view similar to those in FIGS. 1 and 2 of another embodiment of a rotating drive mechanism, and FIG. 3*a* view similar to that of FIGS. 1*a* and 2*a* illustrating the shape of the positioning slot in the embodiment illustrated in FIG. 3.
Figure 3A:
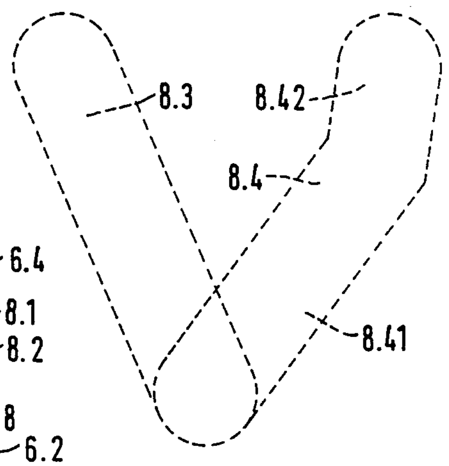

FIGS. 3 and 3*a* illustrate a somewhat different embodiment of a rotating drive mechanism.

The housing 6 of the rotating drive mechanism has a face cap 6.1 and 6.3 at each end, an annular intermediate flange 6.2 in the middle, and a cylindrical jacket with slots 8.4 that constitutes the stator and terminates at the flange. The jacket is covered by a sleeve 6.4. The bottom section, between face cap 6.1 and intermediate flange 6.2, constitutes a hollow cylinder 9.1 that belongs to a drive cylinder 9. The housing is kept together by screws 6.5.

Drive cylinder 9 consists of an outer jacket 9.1, an inner jacket 9.2, a base 6.1, and a cap 6.6. An annular piston 9.3 is positioned tightly between cylinder jackets 9.1 and 9.2. Its tubular piston rod 9.4 surrounds inner jacket 9.2 and extends tightly out of drive cylinder 9 at cap 6.6. Secured to the outside end of piston rod 9.4 is a coupling component 8 with a pair 8.1 and 8.2 of rollers on each opposite side. The coaxially mounted rollers each travel in a positioning slot 8.3 and 8.4. Positioning slot 8.3 is in a rotor 7.4 that is non-rotationally connected to a shaft 7.3 extending coaxially through the housing 6 of the rotating drive mechanism and through the inside of inner cylinder jacket 9.2. Shaft 7.3 extends out of housing 6 at each end. The ends of shaft 7.3 are in one piece with the stubs 7.1 and 7.2 of a driveshaft that extend out of the housing. The roller 8.2 on coupling component 8 is positioned in another positioning groove 8.4 in the stator that is rigidly connected to face cap 6.3 and hence to the housing 6 of the rotating drive mechanism. Positioning slots 8.3 and 8.4 are helical and have opposing pitches, as illustrated in FIG. 3*a*.

Rotor 7.4 is mounted on a ball bearing 7.5 on intermediate flange 6.2.

Positioning slot 8.4 has a final section 8.42 with a pitch that differs slightly from that of section 8.41, varying the transmission ratio.

How the rotating drive mechanism illustrated in FIG. 3 functions will now be described.

When pressure medium is supplied to drive cylinder 9 through inlet 9.5, annular piston 9.3 will descend in the space between cylinder jackets 9.1 and 9.2, axially entraining rollers 8.1 and 8.2 by way of coupling component 8. The motion of rollers 8.1 and 8.2 in positioning slots 8.3 and 8.4 rotates, due to the opposed pitch of the slots, rotor 7.4 in relation to the stator or housing 6 of the rotating drive mechanism. Shaft 7.3 and, with it, driveshaft stubs 7.1 and 7.2 will accordingly rotate. The transmission ratio is dictated by the pitch of positioning slots 8.3 and 8.4, resulting in a variation in the transmission ratio in the last section of the path of motion.

The direction of motion is reversed by supplying pressure medium to 9.6.

It will be appreciated that the instant specifications and claims are set forth by way of illustration and not limitation, and that various modifications and changes may be made without departing from the spirit and scope of the present invention.

What is claimed is:

1. In a rotating drive mechanism for swinging doors, the mechanism having a housing, a drive shaft, a helical transmission comprising a stator that is rigidly connected to the housing of the rotating drive mechanism, a rotatable rotor rigidly connected to the drive shaft and axially fixed, a coupling component axially movable to rotate the rotor relative to the stator, and a drive cylinder with a piston rod connected to the coupling component to axially move the coupling component, the improvement wherein the drive cylinder comprises a double-acting annular cylinder accommodating portions of the rotor or of the drive shaft and having an outer and an inner jacket, a base, a cap and an annular piston positioned tightly against the outer and inner jackets and wherein the piston rod comprises a tubular piston rod extending between the inner jacket and the cap and connected outside of the cylinder to the coupling component.

2. A rotating drive mechanism as in claim 1, wherein the outer jacket of the cylinder is part of the drive-mechanism housing.

3. A rotating drive mechanism as in claim 2, wherein the housing includes face caps at ends thereof and wherein the drive shaft includes takeoff shafts connected to the rotor projecting from both face caps on the drive-mechanism housing.

4. A rotating drive mechanism as in claim 1, wherein the piston rod interlocks only axially with the coupling component.

5. A rotating drive mechanism as in claim 2, wherein the rotor comprises a threaded spindle in one piece with the drive shaft and the coupling component comprises an associated nut, wherein the spindle and the nut are at least partly surrounded by the inner jacket of the cylinder and the nut moves axially inside a positioning mechanism positioned outside the annular cylinder.

6. A rotating drive mechanism as in claim 5, wherein the positioning mechanism has rotating rollers that travel in slots rigidly connected to the drive-mechanism housing.

7. A rotating drive mechanism as in claim 1, wherein the drive shaft extends through the inner cylinder jacket, the rotor is rigidly connected to the drive shaft and has a positioning slot, and axially movable pairs of rollers rotate on the coupling component, wherein one roller of each pair travels in one positioning slot, the other roller of each pair travels in another positioning slot that is rigidly connected to the housing, and the two positioning slots have different pitches.

8. A rotating drive mechanism as in claim 7, wherein the pitch of the positioning slots varies, thereby varying the ratio of the helical transmission as the coupling member moves axially.

* * * * *